(12) United States Patent
Kobori et al.

(10) Patent No.: US 12,489,149 B2
(45) Date of Patent: Dec. 2, 2025

(54) SECONDARY BATTERY

(71) Applicant: Prime Planet Energy & Solutions, Inc., Tokyo (JP)

(72) Inventors: Daichi Kobori, Kobe (JP); Tomoyuki Yamada, Kobe (JP); Kazutaka Mita, Kobe (JP)

(73) Assignee: PRIME PLANET ENERGY & SOLUTIONS, INC., Tokyo (JP)

( * ) Notice: Subject to any disclaimer, the term of this patent is extended or adjusted under 35 U.S.C. 154(b) by 896 days.

(21) Appl. No.: 17/688,166

(22) Filed: Mar. 7, 2022

(65) Prior Publication Data

US 2022/0294022 A1 Sep. 15, 2022

(30) Foreign Application Priority Data

Mar. 9, 2021 (JP) ................................. 2021-037458

(51) Int. Cl.
*H01M 10/0587* (2010.01)
*H01M 10/0525* (2010.01)
(Continued)

(52) U.S. Cl.
CPC ... *H01M 10/0587* (2013.01); *H01M 10/0525* (2013.01); *H01M 50/426* (2021.01); *H01M 50/449* (2021.01); *H01M 50/463* (2021.01)

(58) Field of Classification Search
CPC . H01M 10/0587; H01M 4/623; H01M 50/426
See application file for complete search history.

(56) References Cited

U.S. PATENT DOCUMENTS 10,224,564 B2 * 3/2019 Umeyama ............. H01M 4/505
2008/0241687 A1 10/2008 Ishii et al.
(Continued)

FOREIGN PATENT DOCUMENTS

CN 101276942 A 10/2008
CN 103890999 A 6/2014
(Continued)

OTHER PUBLICATIONS

Min Zheng; Xuewei Fu; Wei-Hong Katie Zhong, PhD; Yu Wang; Louis Scudiero; Jacqueline Reeve ; Poly(vinylidene fluoride) Based Blends as New Binders for Lithium Ion Batteries; Chem. Electro Chem. vol. 5, Issue Aug. 9, 16, 2018. p. 2288-2294. (Year: 2018).*

*Primary Examiner* — Mark Ruthkosky
(74) *Attorney, Agent, or Firm* — HAUPTMAN HAM, LLP

(57) ABSTRACT

Provided is a secondary battery that has a wound electrode assembly that has been precisely wound. A secondary battery is provided with a wound electrode assembly in which a positive electrode plate and a negative electrode plate are wound with a separator interposed therebetween, and is provided with a battery case that houses the wound electrode assembly. The separator has a strip-shaped base material layer and has a surface layer formed on the surface of the base material layer and having a mesh structure formed of polyvinylidene fluoride. The separator is positioned to the outside of a negative electrode trailing end of the negative electrode plate, and the distance between the negative electrode trailing end and a separator trailing end of the separator is not more than 30 mm.

9 Claims, 7 Drawing Sheets

(51) Int. Cl.
  *H01M 50/426*   (2021.01)
  *H01M 50/449*   (2021.01)
  *H01M 50/463*   (2021.01)

(56) References Cited

U.S. PATENT DOCUMENTS

| | | |
|---|---|---|
| 2010/0233525 A1 | 9/2010 | Kaiduka et al. |
| 2011/0135991 A1 | 6/2011 | Sato |
| 2014/0004400 A1 | 1/2014 | Ueki et al. |
| 2014/0248525 A1 | 9/2014 | Iwai et al. |
| 2016/0380299 A1 | 12/2016 | Umeyama et al. |
| 2019/0305379 A1 | 10/2019 | Nonaka |

FOREIGN PATENT DOCUMENTS

| | | | | |
|---|---|---|---|---|
| CN | 106299444 A | | 1/2017 | |
| CN | 108695473 A | | 10/2018 | |
| CN | 110600661 A | * | 12/2019 | ............. H01M 2/16 |
| JP | 2011-138762 A | | 7/2011 | |
| JP | 2012-204243 A | | 10/2012 | |
| JP | 5342089 B1 | | 11/2013 | |
| JP | 2015-69730 A | | 4/2015 | |
| JP | 2015069730 A | * | 4/2015 | |
| JP | 2016-58264 A | | 4/2016 | |
| JP | 2016-100270 A | | 5/2016 | |
| JP | 2017-10878 A | | 1/2017 | |
| JP | 2019-21805 A | | 2/2019 | |
| JP | 2019-179741 A | | 10/2019 | |
| WO | 2012124093 A1 | | 9/2012 | |
| WO | 2013/058371 A1 | | 4/2013 | |

\* cited by examiner

SECONDARY BATTERY

CROSS REFERENCE TO RELATED APPLICATIONS

This application claims priority based on Japanese Patent Application No. 2021-037458 filed Mar. 9, 2021, the contents of which are incorporated in their entirety in this Description by reference.

BACKGROUND OF THE DISCLOSURE

1. Technical Field

The present invention relates to a secondary battery.

2. Background

A secondary battery, e.g., a lithium ion secondary battery, is generally provided with an electrode assembly having a pair of electrode plates (positive electrode plate and negative electrode plate), a battery case that houses this electrode assembly, and electrode terminals (positive electrode terminal and negative electrode terminal) that are exposed on the outside of the battery case. Each of the electrode plates constituting the electrode assembly is provided with, for example, an electrode core (positive electrode core and negative electrode core) that is a metal foil member, and an electrode active material layer (positive electrode active material layer and negative electrode active material layer) that is formed on the surface of the electrode core.

An example of the electrode assembly in such a secondary battery is a wound electrode assembly, in which the positive electrode plate and negative electrode plate are wound with a separator interposed therebetween. For example, a strip-shaped porous film having a base material layer composed of a resin material, e.g., polyethylene (PE), can generally be used for the separator in this kind of wound electrode assembly. In addition, from the standpoint of enhancing secondary battery safety, a separator may also be used that has a heat-resistant surface layer formed on the surface of the base material layer. For example, WO 2012/124093 discloses a separator that has a porous resin layer (base material layer) and a porous heat-resistant layer (surface layer) laminated on at least one side of the resin layer. This heat-resistant layer contains a binder and a filler composed of an inorganic material. This kind of heat-resistant layer-bearing separator inhibits heat shrinkage during temperature increases, and as a consequence can prevent the occurrence of internal short circuiting and can enhance secondary battery safety.

SUMMARY OF THE INVENTION

Polyvinylidene fluoride may be used as the binder constituting the surface layer. A surface layer formed using polyvinylidene fluoride has a mesh network structure and has a relatively large specific surface area. Due to this, the electrode plate in contact with the surface layer of the separator adheres to the surface layer and winding deviations for the electrode assembly as a whole can be suppressed. When a wound electrode assembly is formed by winding electrode plates and a separator, the separator has to be made longer than the electrode plates in order for the separator to be positioned on the outermost circumference of the electrode assembly. A separator having a surface layer constituted of polyvinylidene fluoride has the property of being relatively easily charged. As a consequence, when the separator is wound by itself using a winding device (for example, a winding roller), the concern arises that a precise winding cannot be performed because the separator itself becomes charged and sticks to, for instance, the winding device, and/or creasing and wrinkling are produced in the separator during separator winding. When a secondary battery is fabricated using an electrode assembly in which the electrode plates and separator have not been precisely wound, variability is produced in the pressure applied to the electrode assembly, the reactions during charge/discharge become nonuniform, and lithium may be precipitated.

The present invention has been made considering these circumstances and provides a secondary battery that is provided with a wound electrode assembly that has been precisely wound.

The present invention provides a secondary battery that is provided with: a wound electrode assembly in which a positive electrode plate and a negative electrode plate are wound with a separator interposed therebetween, and a battery case that houses the wound electrode assembly. The positive electrode plate has a strip-shaped positive electrode core and a positive electrode active material layer formed on at least one surface of the positive electrode core. The negative electrode plate has a strip-shaped negative electrode core and a negative electrode active material layer formed on at least one surface of the negative electrode core. The separator has a strip-shaped base material layer and a surface layer, which is formed on at least one surface of the base material layer and which has a mesh structure formed of polyvinylidene fluoride. A negative electrode starting end, which is one end of the negative electrode plate in a longitudinal direction, is positioned on an inside of the wound electrode assembly, and a negative electrode trailing end, which is another end of the negative electrode plate in the longitudinal direction, is positioned on an outside of the wound electrode assembly. A separator starting end, which is one end of the separator in a longitudinal direction, is positioned on the inside of the wound electrode assembly, and a separator trailing end, which is another end of the separator in the longitudinal direction, is positioned on the outside of the wound electrode assembly. The separator is positioned to an outside of the negative electrode trailing end, and a distance between the negative electrode trailing end and the separator trailing end is not more than 30 mm.

As a result of various investigations, the inventors of the present application focused on the fact that the separator becomes more charged, and the production of separator creasing and wrinkling is facilitated, when there is an excessively large distance between the end of the negative plate at which winding is completed (the negative electrode trailing end) and the end of the separator at which winding is completed (the separator trailing end). It was thus discovered that the appearance of these problems can be suppressed by shortening the distance between the negative electrode trailing end and the separator trailing end. That is, the distance between the negative electrode trailing end and the separator trailing end was brought to less than or equal to 30 mm. Shortening the distance between the negative electrode trailing end and the separator trailing end in this manner serves to shorten the length for which the separator is wound by itself. This results in a suppression of the occurrence of separator creasing and wrinkling. In addition, charging of the separator is inhibited due to the shorter separator/winding device contact time when the separator is being wound by itself. This results in an inhibition of sticking by the separator to, for instance, the winding device and enables the separator and so forth to be precisely wound. According to the preceding, a secondary battery provided with a wound electrode assembly that has been precisely wound can be obtained by bringing the distance between the negative electrode trailing end and the separator trailing end to less than or equal to 30 mm.

In a preferred aspect of the herein disclosed secondary battery, the wound electrode assembly is formed in a flat shape and has a pair of curved sections having curved outer surfaces and a flat section, which has a flat outer surface and connects the pair of curved sections, and a dimension in a height direction of the wound electrode assembly is at least 80 mm, when the height direction as a direction perpendicular to a direction of the winding axis of the wound electrode assembly and perpendicular to a thickness direction of the wound electrode assembly. When the wound electrode assembly is pressed to provide a flat shape, the surface layer composed of polyvinylidene fluoride tightly adheres to the electrode plates (here, the positive electrode plate and the negative electrode plate) in contact therewith. This functions to inhibit the occurrence of spring back in the wound electrode assembly post-pressing and to enable a suitable retention of the flat shape. In addition, when the dimension in the height direction of the wound electrode assembly is at least 80 mm, the influence exercised by the magnitude of the distance between the negative electrode trailing end and the separator trailing end becomes particularly prominent, and due to this the effect provided by bringing the distance between the negative electrode trailing end and the separator trailing end to less than or equal to 30 mm is exhibited more prominently.

In a preferred aspect of the herein disclosed secondary battery, a dimension in a width direction of the wound electrode assembly is at least 200 mm, when the width direction is a direction parallel to the direction of the winding axis of the wound electrode assembly and perpendicular to the thickness direction of the wound electrode assembly. When the dimension in the width direction of the wound electrode assembly is at least 200 mm, the influence exercised by the size of the protruding area of the separator (area protruding in the direction of the winding axis) becomes particularly prominent, and due to this the effect provided by bringing the distance between the negative electrode trailing end and the separator trailing end to less than or equal to 30 mm is exhibited more prominently.

In a preferred aspect of the herein disclosed secondary battery, formula below is satisfied, where A is a distance between the negative electrode trailing end and the separator trailing end and B is a dimension in the aforementioned height direction of the flat section of the wound electrode assembly: $A<0.4B$. By doing this, the occurrence of creasing and wrinkling in the separator during wound electrode assembly fabrication is suppressed, as is charging of the separator. As a result, a secondary battery can be provided that has a wound electrode assembly that has been precisely wound.

In a preferred aspect of the herein disclosed secondary battery, the negative electrode trailing end is located in the curved section. This makes it possible to further shorten the separator.

In a preferred aspect of the herein disclosed secondary battery, a winding stop tape, which attaches the separator trailing end to an outermost surface of the wound electrode assembly, is provided, and formulas below is satisfied, where A is a distance between the negative electrode trailing end and the separator trailing end and C is a length of the winding stop tape: $20 \leq C \leq 40$ and $A \geq \frac{1}{2}C$. As a result, unwinding of the wound electrode assembly can be suppressed and, since the winding stop tape and negative electrode trailing end do not overlap, height differences due to the thickness of the winding stop tape can be made small.

A preferred aspect of the herein disclosed secondary battery is provided with a winding stop tape, which attaches the separator trailing end to an outermost perimeter of the wound electrode assembly, wherein the separator trailing end is positioned in a center region of a longitudinal direction of the winding stop tape and the winding stop tape does not overlap with the negative electrode trailing end. As a result, unwinding of the wound electrode assembly can be suppressed and, since the winding stop tape and negative electrode trailing end do not overlap, height differences due to the thickness of the winding stop tape can be made small.

DETAILED DESCRIPTION OF THE PREFERRED EMBODIMENTS

Embodiments of the herein disclosed art are described below with reference to the figures. Matters required for the execution of the herein disclosed art but not particularly described in this Description (for example, general battery structure and production processes) can be understood as design matters for the individual skilled in the art based on the conventional art in the pertinent fields. The herein disclosed art can be implemented based on the contents disclosed in this Description and the common general technical knowledge in the pertinent fields. The terms "A to B" that indicate ranges in this Description encompass the meaning of "at least A and not more than B" as well as the meanings of "preferably larger than A" and "preferably smaller than B".

In this Description, "secondary battery" generally refers to electrical storage devices in which charge/discharge reactions are produced by the migration via an electrolyte of a charge carrier between a pair of electrodes (positive electrode and negative electrode). This secondary battery encompasses capacitors, e.g., electric double-layer capacitors, in addition to so-called storage batteries, e.g., lithium ion secondary batteries, nickel hydride batteries, and nickel-cadmium batteries. Embodiments targeted to lithium ion secondary batteries among these secondary batteries are described in the following.

In the figures provided for reference in this Description, the symbol X represents the "depth direction", the symbol Y represents the "width direction", and the symbol Z represents the "height direction". In addition, with the depth direction X, an F indicates "front" and an Rr indicates "rear". With the width direction Y, an L indicates "left" and an R indicates "right". With the height direction Z, a U indicates "up" and a D indicates "down". However, these directions have been established for the sake of descriptive convenience and are not intended to limit or restrict the mode of installation when the herein disclosed secondary battery is used.

First Embodiment

1. Structure of the Secondary Battery

Figure 1:
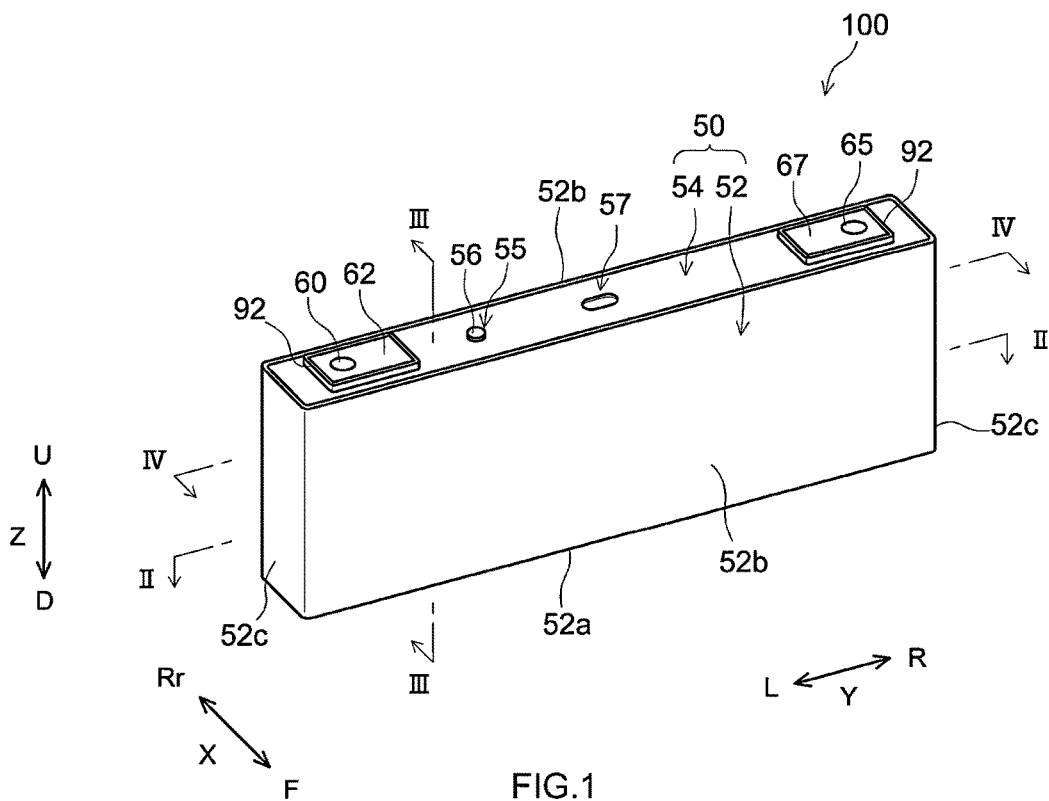
FIG. 1 is a perspective diagram that schematically illustrates a secondary battery according to an embodiment.
Figure 2:
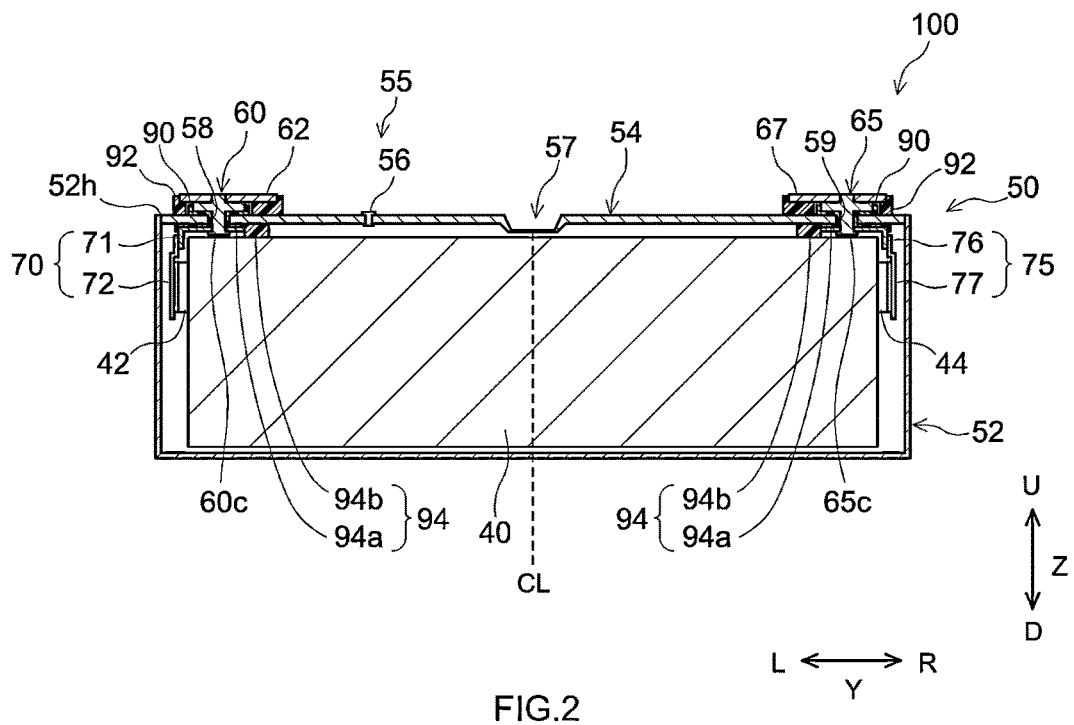
FIG. 2 is a schematic vertical cross-sectional diagram along the II-II line in FIG. 1.
Figure 3:
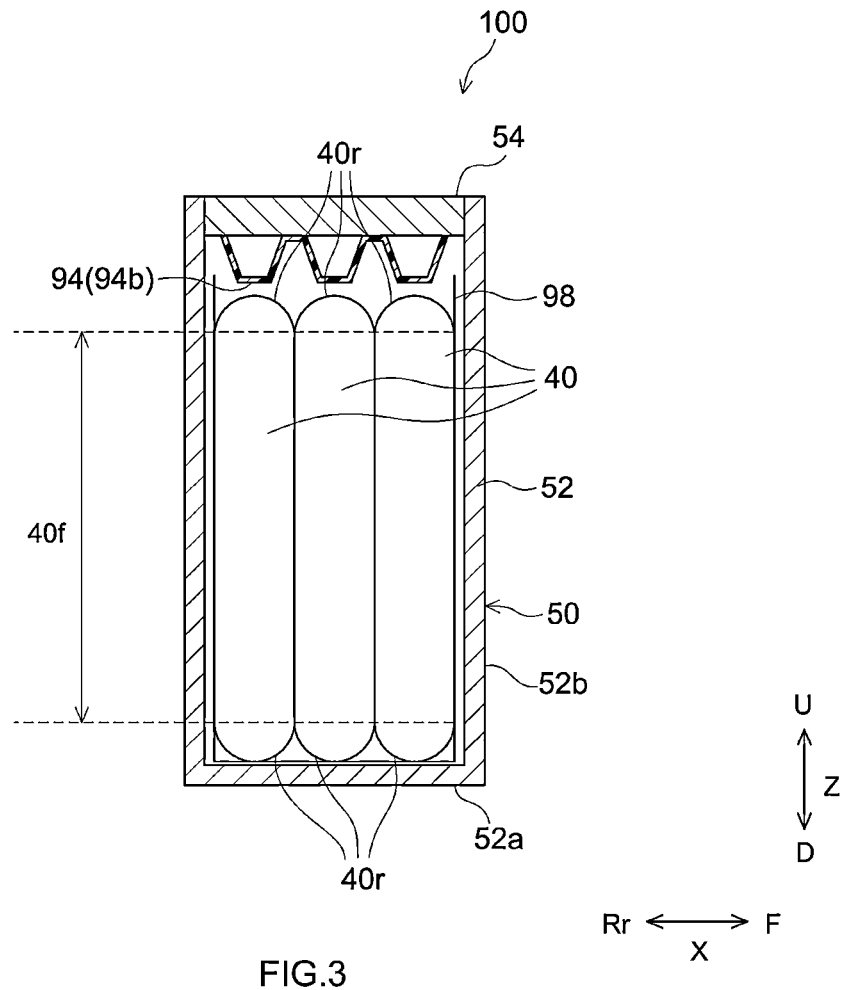
FIG. 3 is a schematic vertical cross-sectional diagram along the line in FIG. 1.
Figure 4:
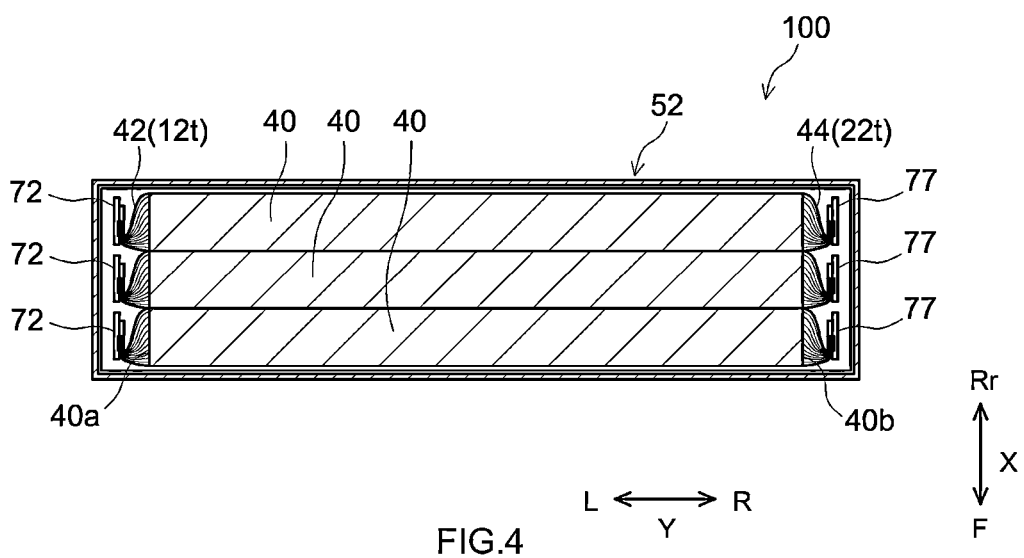
FIG. 4 is a schematic horizontal cross-sectional diagram along the IV-IV line in FIG. 1.
Figure 5:
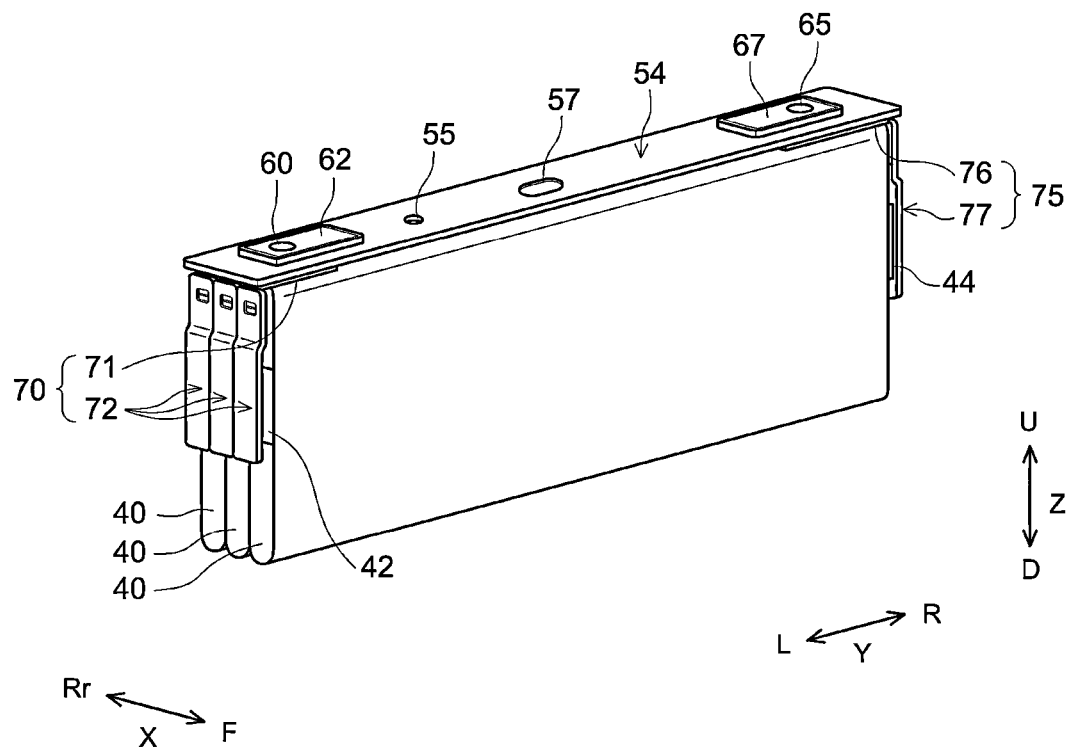
FIG. 5 is a perspective diagram that schematically illustrates an electrode assembly mounted to a sealing plate.
Figure 6:
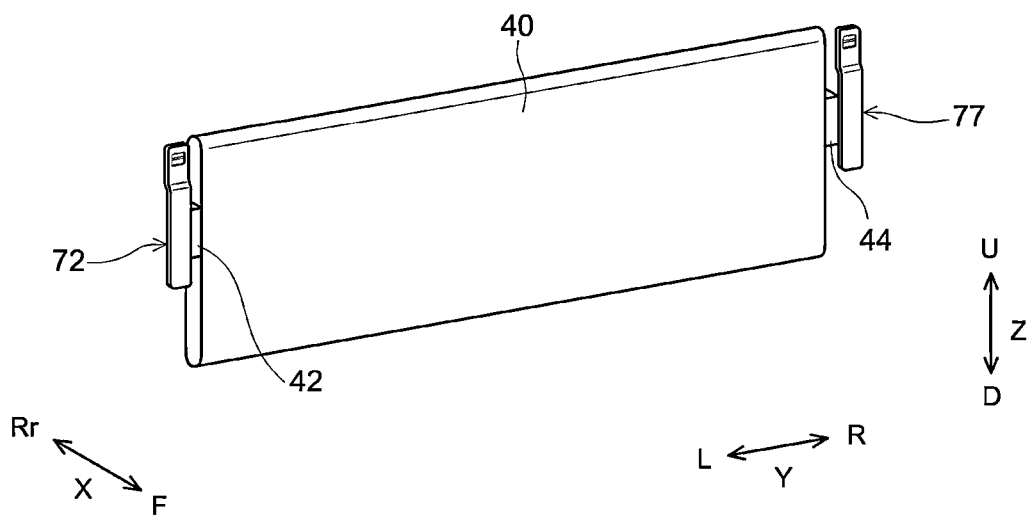
FIG. 6 is a perspective diagram that schematically illustrates an electrode assembly provided with a positive electrode second current collector and a negative electrode second current collector.
Figure 7:
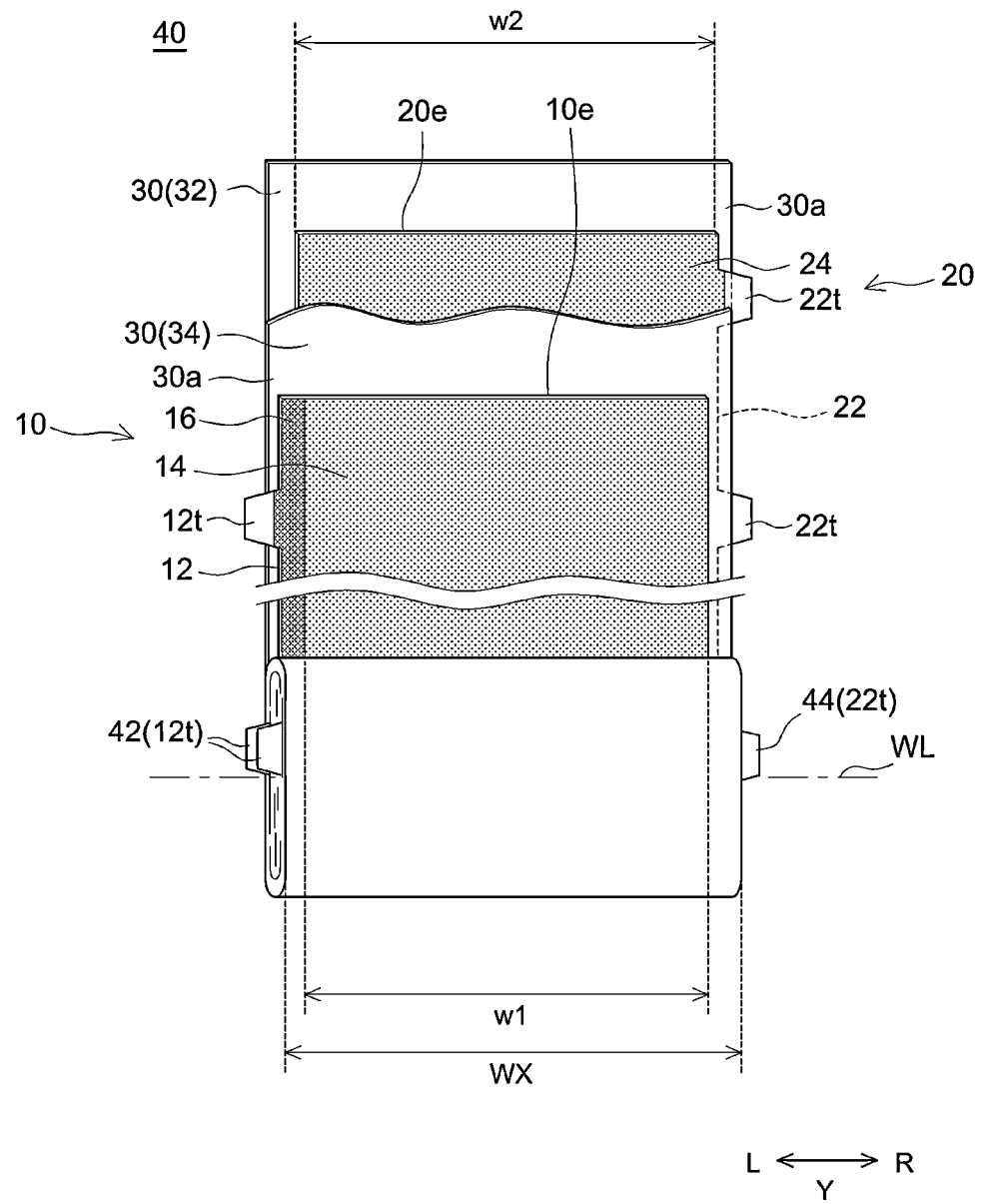
FIG. 7 is a schematic diagram that illustrates the structure of the wound electrode assembly of a secondary battery according to an embodiment.
Figure 8:
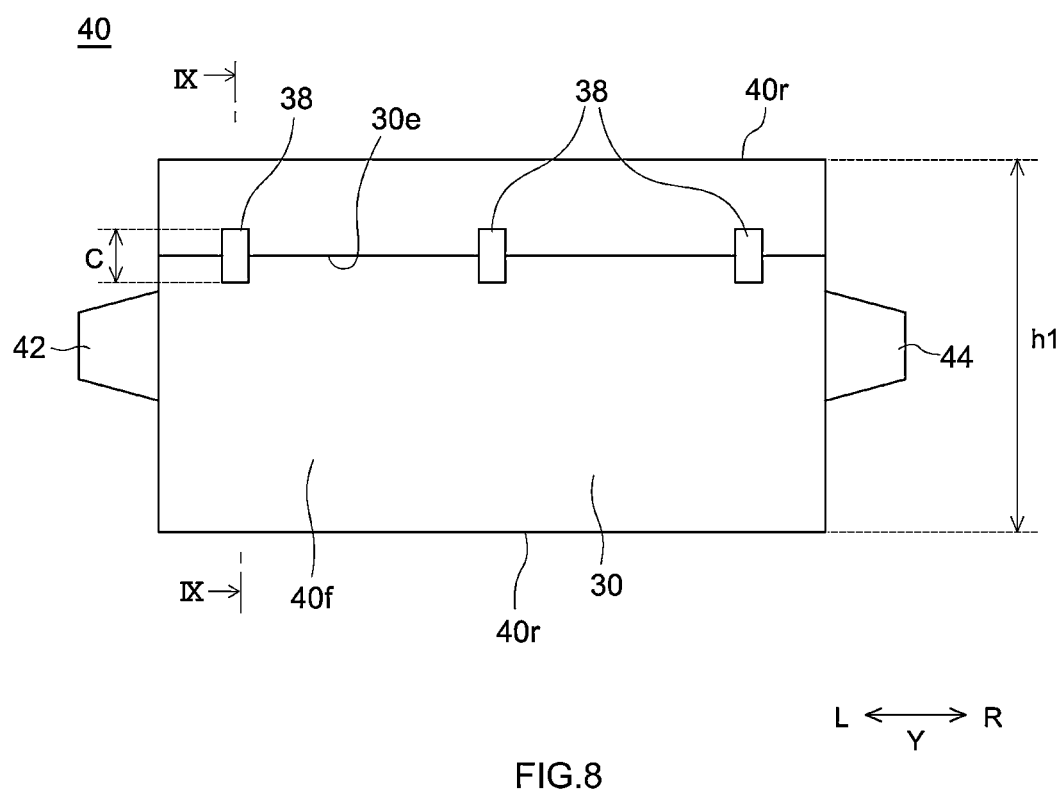
FIG. 8 is a front elevation that schematically illustrates the wound electrode assembly of FIG. 7.
Figure 9:
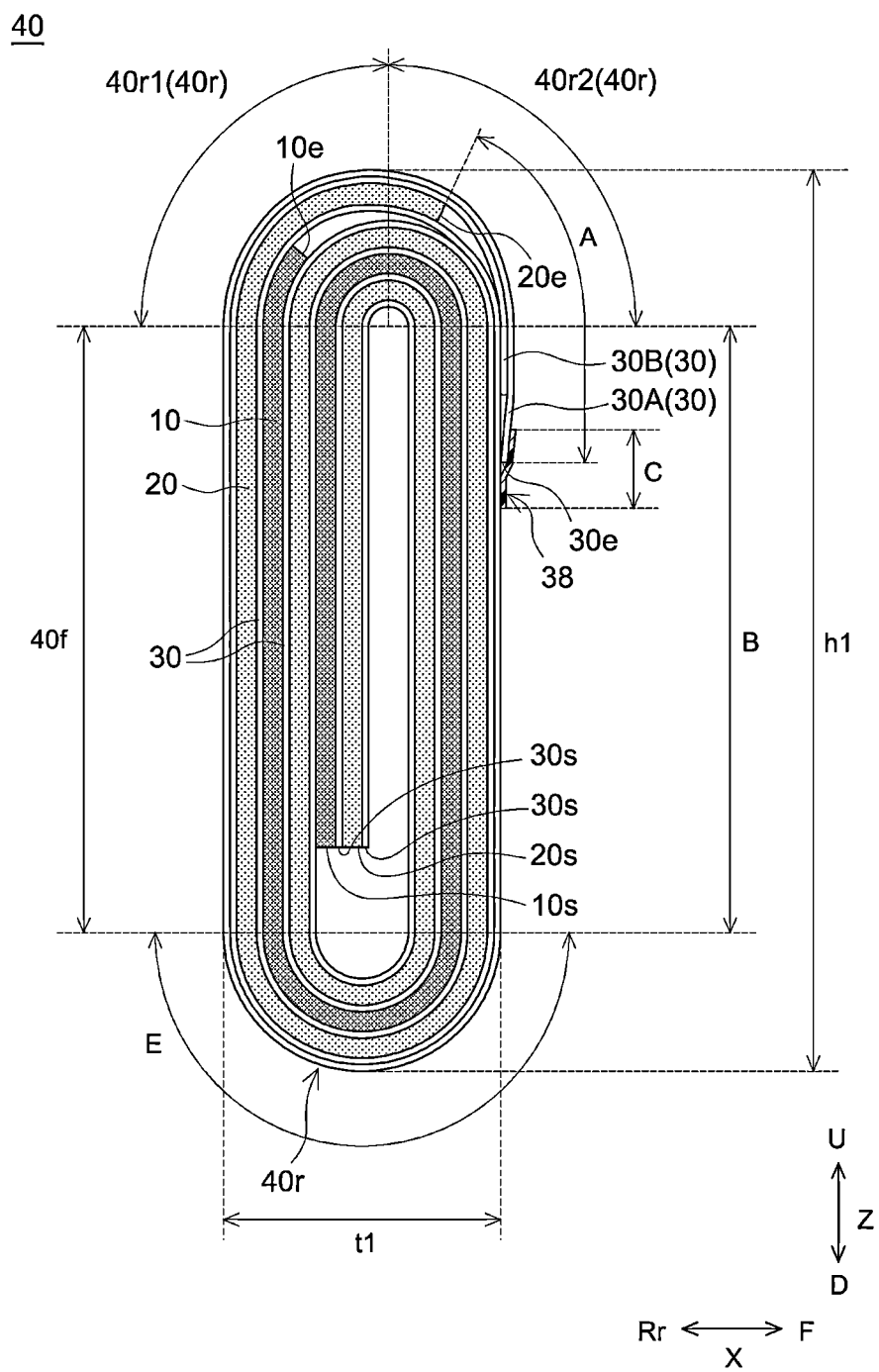
FIG. 9 is a schematic vertical cross-sectional diagram along the IX-IX line in FIG. 8.
Figure 10:
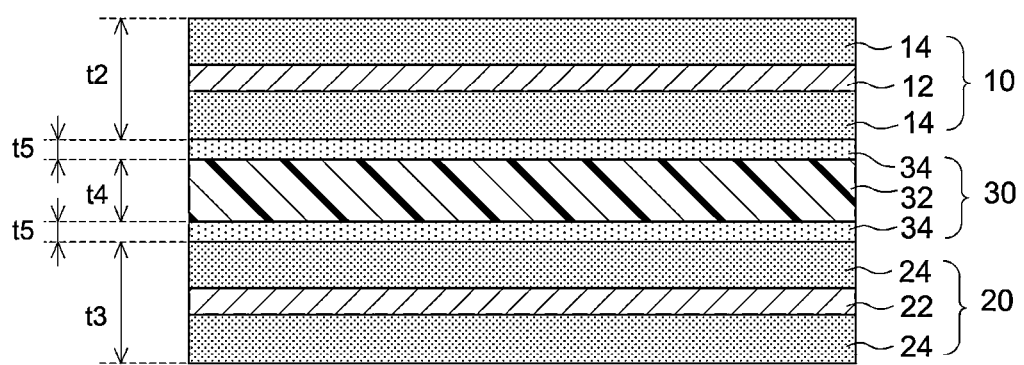
FIG. 10 is an enlarged diagram that schematically illustrates the interface of the separator with the positive electrode plate and the negative electrode plate of the wound electrode assembly of a secondary battery according to an embodiment.

An embodiment of the herein disclosed secondary battery is described in the following with reference to FIG. 1 to FIG. 10. FIG. 1 is a perspective diagram that schematically illustrates the secondary battery according to the present embodiment. FIG. 2 is a schematic vertical cross-sectional diagram along the II-II line in FIG. 1. FIG. 3 is a schematic vertical cross-sectional diagram along the line in FIG. 1. FIG. 4 is a schematic horizontal cross-sectional diagram along the IV-IV line in FIG. 1. FIG. 5 is a perspective diagram that schematically illustrates an electrode assembly mounted in a sealing plate. FIG. 6 is a perspective diagram that schematically illustrates an electrode assembly provided with a positive electrode second current collector and a negative electrode second current collector. FIG. 7 is a schematic diagram that illustrates the structure of the wound electrode assembly of the secondary battery according to the present embodiment. FIG. 8 is a front elevation that schematically illustrates the wound electrode assembly of FIG. 7. FIG. 9 is a schematic vertical cross-sectional diagram along the IX-IX line in FIG. 8. FIG. 10 is an enlarged diagram that schematically illustrates the interface of the separator with the positive electrode plate and the negative electrode plate of the wound electrode assembly of the secondary battery according to the present embodiment.

As shown in FIG. 2, the secondary battery 100 according to the present embodiment is provided with a wound electrode assembly 40 and a battery case 50 that houses the wound electrode assembly 40. The specific structure of this secondary battery 100 is described in the following.

(1) Battery Case

The battery case 50 is a case or housing that holds the wound electrode assembly 40. While not shown, a nonaqueous electrolyte solution is also housed in the interior of the battery case 50. As shown in FIG. 1, the battery case 50 in the present embodiment has the external shape of a flat rectangular parallelepiped (rectangular) and is provided with a bottom. Heretofore known materials can be used without particular limitation for the battery case 50. For example, the battery case 50 may be made of a metal. Aluminum, aluminum alloys, iron, iron alloys, and so forth are examples of the material of this battery case 50.

As shown in FIG. 1 and FIG. 2, the battery case 50 is provided with an outer body 52 and a sealing plate 54. The outer body 52 is a flat rectangular container that has a bottom and that has an opening 52h in its upper surface. The outer body 52 is provided with the following: a planar and approximately rectangular bottom wall 52a; a pair of long-side walls 52b, which extend from the long edges of the bottom wall 52a upward in the height direction Z; and a pair of short-side walls 52c, which extend from the short edges of the bottom wall 52a upward in the height direction Z. The sealing plate 54, on the other hand, is a planar and approximately rectangular plate-shaped member that closes the opening 52h of the outer body 52. The outer peripheral edge of the sealing plate 54 is joined (for example, welded) to the outer peripheral edge of the opening 52h of the outer body 52. This results in the fabrication of the battery case 50 having a hermetically sealed interior. A liquid fill port 55 and a gas exhaust valve 57 are also provided in the sealing plate 54. The liquid fill port 55 is a through-port provided in order to fill the nonaqueous electrolyte solution into the interior of the battery case 50 after sealing. After the nonaqueous electrolyte solution has been introduced, the liquid fill port 55 is sealed by a sealing member 56. The gas exhaust valve 57 is a thin-walled section designed to rupture (open) when gas is produced in large amounts in the battery case 50, thereby releasing the gas.

(2) Electrolyte Solution

As noted above, the interior of the battery case 50 also contains, in addition to the wound electrode assembly 40, an electrolyte solution (not shown). The electrolyte solutions used in heretofore known secondary batteries can be used without particular limitation as this electrolyte solution. For example, a nonaqueous electrolyte solution of a supporting electrolyte dissolved in a nonaqueous solvent can be used for the electrolyte solution. The nonaqueous solvent can be exemplified by carbonate solvents such as ethylene carbonate, dimethyl carbonate, ethyl methyl carbonate, and so forth. The supporting electrolyte can be exemplified by fluorine-containing lithium salts, e.g., $LiPF_6$.

(3) Electrode Terminals

A positive electrode terminal 60 is mounted at one end (left side in FIG. 1 and FIG. 2) in the width direction Y of the sealing plate 54. This positive electrode terminal 60 is connected to a plate-shaped positive electrode outer conductive member 62 on the outside of the battery case 50. A negative electrode terminal 65, on the other hand, is mounted at the other end (the right side in FIG. 1 and FIG. 2) in the width direction Y of the sealing plate 54. A plate-shaped negative electrode outer conductive member 67 is mounted at this negative electrode terminal 65. These external conductive members (the positive electrode outer conductive member 62 and the negative electrode outer conductive member 67) connect, via an external connection member (e.g., a bus bar), to another secondary battery or an external device. The external conductive members are preferably composed of a highly conductive metal (e.g., aluminum, aluminum alloys, copper, copper alloys).

(4) Electrode Current Collector

As shown in FIG. 3 to FIG. 5, a plurality (three) of wound electrode assemblies 40 are housed within the battery case 50 in the secondary battery 100 according to the present embodiment. While the detailed structure is described below, each wound electrode assembly 40 is provided with a positive electrode tab group 42 and a negative electrode tab group 44 (refer to FIG. 7 and FIG. 8). As shown in FIG. 4, these electrode tab groups (the positive electrode tab group 42 and the negative electrode tab group 44) are bent in a condition in which the electrode current collectors (positive electrode current collector 70 and negative electrode current collector 75) are connected.

Specifically, each positive electrode tab group 42 of the plurality of wound electrode assemblies 40 is connected through the positive electrode current collector 70 to the positive electrode terminal 60. This positive electrode current collector 70 is housed in the interior of the battery case 50. As shown in FIG. 2 and FIG. 5, this positive electrode current collector 70 is provided with the following: a positive electrode first current collector 71, which is a plate-shaped conductive member that extends in the width direction Y along the inside surface of the sealing plate 54; and a plurality of positive electrode second current collectors 72, which are plate-shaped conductive members that extend along the height direction Z. A lower terminal section 60c of the positive electrode terminal 60 is inserted, through a terminal insertion hole 58 of the sealing plate 54, into the interior of the battery case 50, and connects with the positive electrode first current collector 71 (refer to FIG. 2). On the other hand, as shown in FIG. 4 to FIG. 6, a plurality of positive electrode second current collectors 72, which correspond to the plurality of wound electrode assemblies 40, is provided in this secondary battery 100. Each positive electrode second current collector 72 is connected to the positive electrode tab group 42 of a wound electrode assembly 40. As shown in FIG. 4 and FIG. 5, the positive electrode tab group 42 of a wound electrode assembly 40 is bent so the positive electrode second current collector 72 faces one side 40a of the wound electrode assembly 40. As a consequence, the upper end of a positive electrode second current collector 72 is electrically connected to the positive electrode first current collector 71.

On the other hand, each negative electrode tab group 44 of the plurality of wound electrode assemblies 40 is connected through the negative electrode current collector 75 to the negative electrode terminal 65. The connection structure on this negative electrode side is approximately the same as the above-described connection structure on the positive electrode side. Specifically, the negative electrode current collector 75 is provided with the following: a negative electrode first current collector 76, which is a plate-shaped conductive member that extends in the width direction Y along the inside surface of the sealing plate 54; and a plurality of negative electrode second current collectors 77, which are plate-shaped conductive members that extend along the height direction Z (refer to FIG. 2 and FIG. 5). A lower terminal section 65c of the negative electrode terminal 65 is inserted, through a terminal insertion hole 59, into the interior of the battery case 50, and connects with the negative electrode first current collector 76 (refer to FIG. 2). On the other hand, each of the plurality of negative electrode second current collectors 77 is connected to the negative electrode tab group 44 of a wound electrode assembly 40 (refer to FIG. 4 to FIG. 6). The negative electrode tab group 44 is bent so the negative electrode second current collector 77 faces the other side 40b of the wound electrode assembly 40. As a consequence, the upper end of a negative electrode second current collector 77 is electrically connected to the negative electrode first current collector 76. A metal having an excellent conductivity (e.g., aluminum, aluminum alloys, copper, copper alloys) can be suitably used for the electrode current collector (positive electrode current collector 70 and negative electrode current collector 75).

(5) Insulating Members

Various insulating members are installed in the secondary battery 100 in order to prevent conduction between the wound electrode assembly 40 and the battery case 50. Specifically, an external insulating member 92 is interposed between the positive electrode outer conductive member 62 (the negative electrode outer conductive member 67) and the outside surface of the sealing plate 54 (refer to FIG. 1). This can prevent conduction between the sealing plate 54 and the positive electrode outer conductive member 62 and between the sealing plate 54 and the negative electrode outer conductive member 67. In addition, a gasket 90 is mounted at each terminal insertion hole 58, 59 of the sealing plate 54 (refer to FIG. 2). This can prevent conduction between the sealing plate 54 and the positive electrode terminal 60 (or the negative electrode terminal 65) that is passed through by the terminal insertion hole 58, 59. An internal insulating member 94 is provided between the positive electrode first current collector 71 (or the negative electrode first current collector 76) and the inside surface of the sealing plate 54. This internal insulating member 94 is provided with a plate-shaped base element 94a that is interposed between the positive electrode first current collector 71 (or the negative electrode first current collector 76) and the inside surface of the sealing plate 54. This can prevent conduction between the sealing plate 54 and the positive electrode first current collector 71 and between the sealing plate 54 and the negative electrode first current collector 76. The internal insulating member 94 is also provided with a projecting element 94b that projects from the inside surface of the sealing plate 54 toward the wound electrode assembly 40 (refer to FIG. 2 and FIG. 3). This can control movement of the wound electrode assembly 40 in the height direction Z and can prevent direct contact between the wound electrode assembly 40 and the sealing plate 54. In addition, the plurality of wound electrode assemblies 40 are housed in the interior of the battery case 50 in a state of envelopment by an electrode assembly holder 98 (refer to FIG. 3) composed of an insulating resin sheet. This can prevent direct contact between the wound electrode assembly 40 and the outer body 52. The material of each of the insulating members described in the preceding should have the prescribed insulating behavior, but is not otherwise particularly limited. For example, synthetic resin materials can be used, e.g., polyolefin resins (for example, polypropylene (PP), polyethylene (PE)) and fluororesins (for example, perfluoroalkoxyalkane (PFA), polytetrafluoroethylene (PTFE)).

(6) Wound Electrode Assembly

As shown in FIG. 7, the electrode assembly used in the secondary battery 100 according to the present embodiment is a flat wound electrode assembly 40 in which a positive electrode plate 10 and a negative electrode plate 20 are wound with a separator 30 interposed therebetween. This flat wound electrode assembly 40 has a pair of curved sections 40r, where the outer surface is curved, and has a flat section 40f, which connects the pair of curved sections 40r and has a flat outer surface. The wound electrode assembly 40 is housed in the battery case 50 in the instant secondary battery 100 such that the winding axis WL of the wound electrode assembly 40 is approximately in agreement with the width direction Y of the secondary battery 100 (refer to FIG. 2). That is, in the following description the "direction of the winding axis" is approximately the same direction as the width direction Y in the figures. The thickness t1 of the wound electrode assembly 40 (refer to FIG. 9) is preferably at least 10 mm. The thickness t1, for example, is preferably 10 mm to 25 mm and is more preferably 11 mm to 15 mm. The "thickness of the wound electrode assembly" denotes the distance between the pair of flat sections 40f. That is, the "thickness of the wound electrode assembly" denotes the length of the wound electrode assembly 40 in the depth direction X. The dimension h1 in the height direction Z of the wound electrode assembly 40 (refer to FIG. 8) is preferably at least 80 mm. The dimension h1 is, for example, preferably 80 mm to 100 mm and is more preferably 90 mm to 95 mm. The "dimension in the height direction of the wound electrode assembly" denotes the length of the wound electrode assembly 40 in the direction that is perpendicular to the direction of the winding axis of the wound electrode assembly 40 and perpendicular to the thickness direction of the wound electrode assembly 40. That is, the "dimension in the height direction of the wound electrode assembly" denotes the length of the wound electrode assembly 40 in the height direction Z. The dimension WX in the width direction Y of the wound electrode assembly 40 (refer to FIG. 7) is preferably at least 200 mm. The dimension WX, for example, is preferably 200 mm to 400 mm and is more preferably 275 mm to 300 mm. The "dimension in the width direction of the wound electrode assembly" denotes the length of the wound electrode assembly 40 in the direction perpendicular to the direction of the winding axis of the wound electrode assembly 40 and perpendicular to the thickness direction of the wound electrode assembly 40. That is, the "dimension in the width direction of the wound electrode assembly" denotes the length of the wound electrode assembly 40 in the width direction Y.

(a) Positive Electrode Plate

As shown in FIG. 7 and FIG. 10, the positive electrode plate 10 is a long strip-shaped member. The positive electrode plate 10 is provided with a positive electrode core 12, which is a strip-shaped metal foil, and with a positive electrode active material layer 14 that is applied to the surface of the positive electrode core 12. Viewed from the standpoint of battery performance, the positive electrode active material layer 14 is preferably applied to both sides of the positive electrode core 12. In addition, a positive electrode tab 12t projects from one edge of the positive electrode plate 10, considered in the direction of the winding axis (width direction Y), toward the outside (left side in FIG. 7). A plurality of these positive electrode tabs 12t are formed leaving a prescribed interval therebetween in the longitudinal direction of the long strip-shaped positive electrode plate 10. This positive electrode tab 12t is a region where the positive electrode active material layer 14 is not applied and the positive electrode core 12 is exposed. A protective layer 16 is formed, extending along the longitudinal direction of the positive electrode plate 10, in the region adjacent to the edge on the side of the positive electrode tab 12t of the positive electrode plate 10.

Those materials heretofore known to be usable in common secondary batteries (for example, lithium ion secondary batteries) can be used without particular limitation for each of the members making up the positive electrode plate 10. For example, a metal material having a prescribed electrical conductivity can preferably be used for the positive electrode core 12. The positive electrode core 12 is preferably composed of, for example, aluminum, aluminum alloy, and so forth.

The positive electrode active material layer 14 is a layer that contains a positive electrode active material. The positive electrode active material is a particulate material that can reversibly intake and discharge a charge carrier. A lithium transition metal composite oxide is preferred from the standpoint of carrying out the stable fabrication of a high-performance positive electrode plate 10. Among the lithium transition metal composite oxides, particularly favorable lithium transition metal composite oxides contain at least one selection from the group consisting of nickel (Ni), cobalt (Co), and manganese (Mn) as the transition metal. The following are specific examples: lithium nickel cobalt manganese-type composite oxides (NCMs), lithium nickel-type composite oxides, lithium cobalt-type composite oxides, lithium manganese-type composite oxides, lithium nickel manganese-type composite oxides, lithium nickel cobalt aluminum-type composite oxides (NCAs), and lithium iron nickel manganese-type composite oxides. Lithium iron phosphate-type composite oxides (LFPs) are examples of favorable lithium transition metal composite oxides that do not contain Ni, Co, or Mn. In the present Description, "lithium nickel cobalt manganese-type composite oxide" is a term that encompasses oxides that contain an element or elements in addition to the essential constituent elements (Li, Ni, Co, Mn, O). Examples of this additional element or elements are representative metal elements and transition metal elements, e.g., Mg, Ca, Al, Ti, V, Cr, Si, Y, Zr, Nb, Mo, Hf, Ta, W, Na, Fe, Zn, and Sn. In addition, the additional element or elements may be a semimetal element, e.g., B, C, Si, and P, or a nonmetal element, e.g., S, F, Cl, Br, and I. While a detailed description has been omitted, this is also the same for other lithium transition metal composite oxides that are described as "-type composite oxides". The positive electrode active material layer 14 may also contain an additive in addition to the positive electrode active material. This additive can be exemplified by conductive materials, binders, and so forth. The conductive material can be specifically exemplified by carbon materials, e.g., acetylene black (AB) and so forth. The binder can be specifically exemplified by resin binders such as polyvinylidene fluoride (PVdF) and so forth. Using 100 mass % for the total solids fraction of the positive electrode active material layer 14, the content of the positive electrode active material is generally at least 80 mass % and is typically at least 90 mass %.

The width dimension w1 of the positive electrode active material layer 14 (refer to FIG. 7) is preferably at least 100 mm. The width dimension w1 of the positive electrode active material layer 14 is preferably 100 mm to 350 mm and is more preferably 275 mm to 300 mm. Since the size of the wound electrode assembly 40 increases in accordance with the length of the width dimension w1 of the positive electrode active material layer 14, the appearance of creasing and wrinkling in the separator 30 tends to be facilitated and the appearance of static electricity generated at the separator 30 tends to be facilitated when winding of the separator 30 is finished. Here, the "width dimension of the positive electrode active material layer" denotes the length of the positive electrode active material layer in the direction along which the winding axis of the wound electrode assembly extends (the direction of the winding axis).

The protective layer 16, on the other hand, is a layer constituted so as to provide an electrical conductivity lower than that of the positive electrode active material layer 14. The disposition of this protective layer 16 in the region adjacent to the edge of the positive electrode plate 10 can prevent the internal short circuiting due to the direct contact between the positive electrode core 12 and the negative electrode active material layer 24 that occurs when the separator 30 is ruptured. For example, the formation of a layer containing insulating ceramic particles is preferred for the protective layer 16. The ceramic particles can be exemplified by inorganic oxides, e.g., alumina ($Al_2O_3$), magnesia (MgO), silica ($SiO_2$), and titania ($TiO_2$); nitrides, e.g., aluminum nitride and silicon nitride; metal hydroxides, e.g., calcium hydroxide, magnesium hydroxide, and aluminum hydroxide; clay minerals, e.g., mica, talc, boehmite, zeolite, apatite, and kaolin; and glass fiber. Based on considerations of the insulating behavior and heat resistance, alumina, boehmite, aluminum hydroxide, silica, and titania are preferred among the preceding. The protective layer 16 may also contain a binder in order to bring about attachment of the aforementioned ceramic particles to the surface of the positive electrode core 12. This binder can be exemplified by resin binders, e.g., polyvinylidene fluoride (PVdF) and so forth. The protective layer is not an essential constituent feature of the positive electrode plate. Thus, a positive electrode plate on which the protective layer is not formed may also be used in the herein disclosed secondary battery.

The thickness t2 of the positive electrode plate 10 (refer to FIG. 10) is preferably at least 80 μm and is more preferably at least 100 μm and still more preferably at least 120 μm. A positive electrode plate 10 having such a substantial thickness exhibits a large elastic action after press molding, and as a consequence spring back, in which the flat section 40f undergoes expansion, is produced by the elastic action that remains at the curved section 40r and the interelectrode distance can readily increase. While the details are described below, the increase in the interelectrode distance caused by spring back can also be favorably restrained using the herein disclosed art. From the standpoint of facilitating the prevention of spring back, the thickness of the positive electrode plate 10 is preferably not more than 200 μm, more preferably not more than 180 μm, and still more preferably not more than 160 μm. In the present Description, the "thickness of the positive electrode plate" is the total thickness of the positive electrode core and the positive electrode active material layer.

(b) Negative Electrode Plate

As shown in FIG. 7 and FIG. 10, the negative electrode plate 20 is a long, strip-shaped member. This negative electrode plate 20 is provided with a negative electrode core 22, which is a strip-shaped metal foil, and with a negative electrode active material layer 24, which is applied on a surface of the negative electrode core 22. Viewed from the standpoint of battery performance, the negative electrode active material layer 24 is preferably applied on both sides of the negative electrode core 22. A negative electrode tab 22t, which projects towards the outside (the right side in FIG. 7) from one edge considered in the direction of the winding axis (width direction Y), is disposed on this negative electrode plate 20. A plurality of negative electrode tabs 22t are provided leaving a prescribed interval therebetween in the longitudinal direction of the negative electrode plate 20. This negative electrode tab 22t is a region where the negative electrode active material layer 24 is not applied and the negative electrode core 22 is exposed.

Those materials heretofore known to be usable in common secondary batteries (for example, lithium ion secondary batteries) can be used without particular limitation for each of the members making up the negative electrode plate 20. For example, a metal material having a prescribed electrical conductivity can preferably be used for the negative electrode core 22. The negative electrode core 22 is preferably composed of, for example, copper, copper alloy, and so forth.

The negative electrode active material layer 24 is a layer that contains a negative electrode active material. The negative electrode active material should be able to reversibly intake and discharge the charge carrier in cooperation with the previously described positive electrode active material, but is not otherwise particularly limited, and those materials heretofore usable in ordinary conventional secondary batteries can be used without particular limitation. The negative electrode active material can be exemplified by carbon materials, silicon materials, and so forth. For example, graphite, hard carbon, soft carbon, amorphous carbon, and so forth can be used as the carbon material. Also usable is amorphous carbon-coated graphite provided by coating the surface of graphite with amorphous carbon. The silicon material, on the other hand, can be exemplified by silicon, silicon oxide (silica), and so forth. The silicon material may contain another metal element (for example, an alkaline-earth metal) and/or an oxide thereof. The negative electrode active material layer 24 may contain an additive in addition to the negative electrode active material. This additive can be exemplified by binders, thickeners, and so forth. The binder can be specifically exemplified by rubber binders such as styrene-butadiene rubber (SBR). The thickener can be specifically exemplified by carboxymethyl cellulose (CMC). The content of the negative electrode active material, using 100 mass % for the total solids fraction in the negative electrode active material layer 24, is generally at least 30 mass % and is typically at least 50 mass %. The negative electrode active material may account for 80 mass % or more or 90 mass % or more of the negative electrode active material layer 24. The width dimension w2 (refer to FIG. 7) of the negative electrode active material layer 24 is preferably at least 120 mm. The width dimension w2 of the negative electrode active material layer 24 is preferably 120 mm to 370 mm and is more preferably 280 mm to 305 mm.

The thickness t3 (refer to FIG. 10) of the negative electrode plate 20 is preferably at least 100 μm, more preferably at least 130 μm, and still more preferably at least 160 μm. Just as for the previously described positive electrode plate 10, when the negative electrode plate 20 is thicker this creates the potential for promoting an increase in the interelectrode distance caused by spring back. However, in accordance with the herein disclosed art, the production of spring back can be favorably suppressed even when the negative electrode plate 20 assumes such thicknesses. On the other hand, viewed from the perspective of facilitating the prevention of spring back, the thickness of the negative electrode plate 20 is preferably not more than 250 μm, more preferably not more than 220 μm, and still more preferably not more than 190 μm. The "thickness of the negative electrode plate" in this Description is the total thickness of the negative electrode core and the negative electrode active material layer.

(c) Separator

As shown in FIG. 7 and FIG. 9, the wound electrode assembly 40 in the present embodiment is provided with two separators 30. Each of the separators 30 is an insulating sheet in which there are formed a plurality of microfine through holes through which the charge carrier can pass. The interposition of this separator 30 between the positive electrode plate 10 and the negative electrode plate 20 can prevent contact between the positive electrode plate 10 and the negative electrode plate 20 while enabling the movement of the charge carrier (for example, the lithium ion) between the positive electrode plate 10 and the negative electrode plate 20.

As shown in FIG. 10, the separator 30 in the present embodiment has a strip-shaped base material layer 32 and a surface layer 34 formed on the surface (both sides) of the base material layer 32. While the details of the mechanism are described below, in the present embodiment the positive electrode plate 10 adheres to one of the surface layers 34 in the separator 30 having the indicated structure and the negative electrode plate 20 adheres to the other surface layer 34. This results in a satisfactory expression of the interelectrode distance-maintenance function due to the separator 30. In addition, increases in the interelectrode distance caused by spring back can also be inhibited since expansion of the flat section 40f (refer to FIG. 9) of the wound electrode assembly 40 in the thickness direction (the depth direction X) is also controlled. The separator 30 having this structure is described in the following.

The base material layers used for the separators in heretofore known secondary batteries can be used without particular limitation for the base material layer 32. For example, the base material layer 32 is preferably a porous sheet-shaped member that contains, for example, a polyolefin resin. As a result of this, the flexibility of the separator 30 can be satisfactorily maintained and fabrication of the wound electrode assembly 40 (winding and press forming) can be carried out easily. For example, polyethylene (PE), polypropylene (PP), and so forth, or a mixture thereof, can be used as the polyolefin resin. The base material layer 32 preferably is composed of polyethylene. The thickness t4 (refer to FIG. 10) of the base material layer 32 is preferably 5 µm to 25 µm and is more preferably 12 µm to 20 µm. In addition, the permeability of the base material layer 32 is preferably 50 s/100 cc to 300 s/100 cc and is more preferably 100 s/100 cc to 250 s/100 cc. The permeability is measured, for example, by the Gurley test method. The void ratio of the base material layer 32 is preferably 20% to 70%, more preferably 30% to 60%, and still more preferably 40% to 50%. This makes it possible to bring about an advantageous migration of the charge carrier between the positive electrode plate 10 and the negative electrode plate 20. In this Description, the "void ratio", unless specifically indicated otherwise, refers to the void ratio prior to press molding. This "void ratio prior to press molding" can be obtained, using as the measurement target, the separator disposed in a region not facing the positive electrode plate or the negative electrode plate. This "region not facing the positive electrode plate or negative electrode plate" can be exemplified by the "region 30a where only the separator 30 projects out" that is formed at the edges on both sides of the wound electrode assembly 40 in FIG. 7.

As shown in FIG. 10, the surface layer 34 in the present embodiment is a layer formed on both sides of the base material layer 32. This surface layer 34 contains inorganic particles and polyvinylidene fluoride (PVdF) as a binder. The inorganic particles can be exemplified by ceramic particles that contain, as their main component, a ceramic such as alumina, silica, titania, boehmite, aluminum hydroxide, magnesium carbonate, magnesia, zirconia, zinc oxide, iron oxide, ceria, yttria, and so forth. A surface layer 34 containing this kind of inorganic particle exhibits an excellent heat resistance. This can suppress thermal shrinkage of the separator 30 during temperature rises and can contribute to enhancing the safety of the secondary battery 100. Among the aforementioned ceramic particles, alumina particles and boehmite particles are particularly advantageous with regard to suppressing the thermal shrinkage of the separator 30. The average particle diameter of the inorganic particles, for example, is preferably 0.05 µm to 3.0 µm and more preferably 0.1 µm to 1.0 µm. In addition, the specific surface area of the inorganic particles, for example, is advantageously about 2 $m^2/g$ to 13 $m^2/g$. In this Description, the "average particle diameter" means the particle diameter ($D_{50}$ particle diameter) at the 50% integration value in the particle size distribution determined by a laser diffraction/scattering procedure. In addition, the thickness t5 of the surface layer 34 (refer to FIG. 10) is preferably 1 µm to 4 µm and is more preferably 1.5 µm to 3 µm. Adherence to the electrode plates can be more favorably exhibited by PVdF. Moreover, because PVdF is used in the surface layer 34, PVdF is preferably incorporated as a binder in the positive electrode active material layer 14 of the positive electrode plate 10 that faces the surface layer 34. This makes it possible to bring about an additional enhancement of the adhesive strength between the surface layer 34 and the positive electrode plate 10.

The inorganic particle content in the surface layer 34 is preferably adjusted so a prescribed adhesiveness versus the positive electrode plate 10 (or negative electrode plate 20) is exhibited. For example, the inorganic particle content in the surface layer 34 is preferably less than 90 mass % and is more preferably not more than 85 mass % and still more preferably not more than 80 mass % (for example, 75 mass %). When the inorganic particle content in the surface layer 34 is not more than a certain level such as this, the surface layer 34 readily undergoes deformation during press molding, which enables a favorable expression of the interelectrode distance-maintenance effect due to the interlocking (adherence) between the positive electrode plate 10 (or negative electrode plate 20) and the surface layer 34. When, on the other hand, the inorganic particle content in the surface layer 34 is reduced too much, the content of the resin material, e.g., binder, then becomes relatively large and this results in the potential for the production of tackiness in the surface layer 34 prior to press molding. Such a case can impede winding of the positive electrode plate 10 and negative electrode plate 20 with the separator 30 interposed therebetween. Viewed from these perspectives, the inorganic particle content in the surface layer 34 is preferably at least 60 mass %, more preferably at least 65 mass %, and particularly preferably at least 70 mass % (for example, 75 mass %). Short circuiting due to thermal expansion of the separator 30 can also be favorably stopped by forming a surface layer 34 that contains the inorganic particles at least a certain level such as this. In the present Description, the "inorganic particle content" is the mass ratio of the inorganic particles to the total mass of the surface layer.

The surface layer 34 has a mesh structure that contains a plurality of voids and is composed of polyvinylidene fluoride. In this surface layer 34, the inorganic particles are dispersed in the interior of the polyvinylidene fluoride, which has been hardened in a mesh configuration. The surface layer 34 having such a mesh structure exhibits a high flexibility and as a result undergoes a flattening deformation during press molding. As a consequence, variability in the thickness t1 of the wound electrode assembly 40 can be absorbed in the separator 30, and this can suppress the charge carrier precipitation due to variability in the interelectrode distance. The void ratio of the mesh-structured surface layer 34 is preferably 30% to 90%, more preferably 40% to 80%, and particularly preferably 55% to 75%. This provides the surface layer 34 with a favorable flexibility and can suppress variability in the thickness t1 of the wound electrode assembly 40, while enabling the retention of the strength of the separator 30.

A method for producing the flat wound electrode assembly 40 is described in the following. This production method contains (1) a winding step and (2) a press molding step.

(1) Winding Step

In this step, a stack is first fabricated by stacking a separator 30, negative electrode plate 20, separator 30, and positive electrode plate 10 in the indicated sequence (refer to FIG. 7). When this is done, the stacking positions in the width direction Y of the various sheet members are adjusted such that only the positive electrode tab 12t of the positive electrode plate 10 projects out from one side edge (the left side in FIG. 7) in the width direction Y and only the negative electrode tab 22*t* of the negative electrode plate 20 projects out from the other side edge (the right side in FIG. 7). A cylindrical wound electrode assembly 40 is fabricated by winding the resulting stack. The number of windings at this point is preferably adjusted as appropriate considering, e.g., the properties of, and the production efficiency for, the target secondary battery 100. The wound electrode assembly 40 shown in FIG. 9 has a substantially reduced number of windings for the sake of descriptive convenience. That is, the number of windings of the wound electrode assembly 40 shown in FIG. 9 does not limit the number of windings of the herein disclosed wound electrode assembly.

Here, the length in the longitudinal direction of the positive electrode plate 10, the negative electrode plate 20, and the separator 30 that constitute the wound electrode assembly 40 increases in the sequence positive electrode plate 10, negative electrode plate 20, separator 30. That is, the separator 30 is the longest. As shown in FIG. 9, the separator 30 is disposed to the outside of the negative electrode trailing end 20*e* of the negative electrode plate 20. The distance A between the negative electrode trailing end 20*e* and the separator trailing end 30*e* of the separator 30 (that is, the distance A in the circumferential direction) is set to less than or equal to 30 mm (for example, 10 mm to 30 mm). For example, the length in the longitudinal direction of the separator 30 can be adjusted as appropriate by, for example, cutting the separator 30. The separator trailing end 30*e* is the trailing end of the outside separator 30A of the two separators 30. The inside separator 30B of the two separators 30 may be shorter than the outside separator 30A. As described above, since the separator 30 is the longest, only the separator 30 is being wound just prior to the completion of winding of the stack. Due to this, there is concern that the separator 30 will undergo charging and will stick to other members and creasing and wrinkling will be produced in the separator 30 until winding is completed. However, the appearance of these problems can be suppressed by bringing the distance A between the negative electrode trailing end 20*e* and the separator trailing end 30*e* to not more than 30 mm in accordance with the herein disclosed art, and a wound electrode assembly 40 that has been precisely wound can then be fabricated. When winding of the separator 30 has been completed, the separator trailing end 30*e* is attached to the outermost periphery (the separator 30A in this case) of the wound electrode assembly 40 by the winding stop tape 38. The winding stop tape 38 is attached in order to prevent the wound electrode assembly 40 from unwinding. The winding stop tape 38 is located in the flat section 40*f*. The length C in the longitudinal direction (the circumferential direction or height direction Z of the wound electrode assembly 40) of the winding stop tape 38 is, for example, 20 mm to 40 mm. The separator trailing end 30*e* is located in the center region in the longitudinal direction of the winding stop tape 38. This center region in the longitudinal direction of the winding stop tape 38 indicates the region encompassed by a length that is ±10% from the center in the longitudinal direction of the winding stop tape 38. The winding stop tape 38 does not overlap with the negative electrode starting end 20*s* or the negative electrode trailing end 20*e*.

(2) Press Molding Step

In this step, the flat wound electrode assembly 40 (refer to FIG. 9) is fabricated by pressing the wound electrode assembly 40. As shown in FIG. 9, after this press molding the flat wound electrode assembly 40 has a pair of curved sections 40*r*, where the outer surface is curved, and has a flat section 40*f*, which connects the pair of curved sections 40*r* and has a flat outer surface. In the present embodiment, the surface layer 34 of the separator 30 is adhered with the positive electrode plate 10 and negative electrode plate 20 in press molding. Specifically, as a result of the crushing of the wound electrode assembly 40 in press molding, a large pressure is applied to each of the sheet-shaped members (positive electrode plate 10, negative electrode plate 20, and separator 30) located in the flat section 40*f*. By adjusting, for example, the inorganic particle content in the surface layer 34, the pressure in press molding, and so forth, in the present embodiment, the surface layer 34 is caused to deform at this point in conformity to the unevenness in the surface of the positive electrode active material layer 14 (or the negative electrode active material layer 24). This results in interlocking/interference and adhesion between the separator 30 and the positive electrode plate 10 and the negative electrode plate 20 at the interface between the separator 30 and the positive electrode plate 10 and the negative electrode plate 20 in the flat section 40*f* of the wound electrode assembly 40, and due to this the interelectrode distance between the positive electrode plate 10 and the negative electrode plate 20 due to the separator 30 is maintained. Spring back-induced increases in the interelectrode distance can also be suppressed.

As shown in FIG. 9, in the flat wound electrode assembly 40 after the press molding, the positive electrode starting end 10*s*, which is one end of the strip-shaped positive electrode plate 10 in the longitudinal direction, is positioned on the inside of the wound electrode assembly 40. The positive electrode trailing end 10*e*, which is the other end of the positive electrode plate 10 in the longitudinal direction, is positioned on the outside of the wound electrode assembly 40. The positive electrode starting end 10*s* is located in the flat section 40*f* of the wound electrode assembly 40. The positive electrode trailing end 10*e* is located in a first curved section 40*r*1 of the wound electrode assembly 40. This first curved section 40*r*1 is the region located rearward when the curved section 40*r* is divided into two equal portions in the depth direction X, and is a region that is curved downward moving from the front to the rear. In addition, the negative electrode starting end 20*s*, which is one end of the strip-shaped negative electrode plate 20 in the longitudinal direction, is positioned on the inside for the wound electrode assembly 40. The negative electrode trailing end 20*e*, which is the other end of the negative electrode plate 20 in the longitudinal direction, is positioned on the outside of the wound electrode assembly 40. The negative electrode starting end 20*s* is located in the flat section 40*f* of the wound electrode assembly 40. The negative electrode trailing end 20*e* is located in a second curved section 40*r*2 of the wound electrode assembly 40. This second curved section 40*r*2 is the region located forward when the curved section 40*r* is divided into two equal portions in the depth direction X, and is a region that is curved downward moving from the rear to the front. The separator starting end 30*s*, which is one end of the strip-shaped separator 30 in the longitudinal direction, is positioned on the inside of the wound electrode assembly 40. The separator trailing end 30*e*, which is the other end of the separator 30 in the longitudinal direction, is located on the outside of the wound electrode assembly 40. The separator starting end 30*s* and the separator trailing end 30*e* are both located in the flat section 40*f* of the wound electrode assembly 40.

The formula $A<0.4B$ is satisfied by the flat wound electrode assembly 40 where, as shown in FIG. 9, A is the distance between the negative electrode trailing end 20*e* and the separator trailing end 30*e* and B is the dimension in the height direction Z of the flat section 40*f* of the wound electrode assembly 40. As a result of this, during fabrication of the wound electrode assembly 40 the generation of creasing and wrinkling in the separator 30 can be suppressed and charging of the separator 30 can also be suppressed. In addition, the formulas 20≤C≤40 and A≥½C are satisfied where C is the length in the longitudinal direction (circumferential direction or height direction Z of the wound electrode assembly 40) of the winding stop tape 38. As a result of this, unwinding of the wound electrode assembly 40 can be inhibited and, because the winding stop tape 38 and the negative electrode trailing end 20*e* do not overlap, height differences due to the thickness of the winding stop tape 38 can be made small.

Other Embodiments

An embodiment of the herein disclosed art has been described in the preceding. The preceding embodiment represents one example of the application of the herein disclosed art and is not a limitation on the herein disclosed art. Other embodiments of the herein disclosed art are described below.
(1) Side for Formation of the Surface Layer The surface layer 34 is formed on both sides of the base material layer 32 in the embodiment described above. However, the surface layer need not be formed on both sides of the base material layer and may be formed on at least one of the surfaces of the base material layer. However, considering, e.g., the adherence between the separator and the electrode assembly and inhibition of thermal expansion of the separator, the surface layer is preferably formed on both sides of the base material layer. According to the preceding description, the surface layer tends to have a better adherence to the positive electrode plate than the negative plate. Considering this, the formation of the surface layer on the surface on the side in contact with the positive electrode plate is preferred when the surface layer is formed on only one of the surfaces of the base material layer.
(2) Number of Wound Electrode Assemblies The secondary battery 100 according to the embodiment described above has three wound electrode assemblies 40 housed in the interior of the battery case 50. However, the number of electrode assemblies housed within one battery case is not particularly limited and may be at least two (a plurality) or may be one.
(3) Dimensions of the Wound Electrode Assembly The herein disclosed art can be favorably applied to a secondary battery 100 that is provided with a wound electrode assembly 40 having the following external dimensions: a wound electrode assembly 40 in which the distance A between the negative electrode trailing end 20*e* and the separator trailing end 30*e* of the separator 30 is within 250% of the thickness t1 of the wound electrode assembly 40 (i.e., A≤2.5t1; a wound electrode assembly 40 in which the distance A between the negative electrode trailing end 20*e* and the separator trailing end 30*e* of the separator 30 is within 150% of the length E in the circumferential direction of the curved section 40*r* (refer to FIG. 9) of the wound electrode assembly 40 (i.e., A≤1.5E); a wound electrode assembly 40 in which the distance A between the negative electrode trailing end 20*e* and the separator trailing end 30*e* of the separator 30 is within 30% of the dimension h1 in the height direction Z of the wound electrode assembly 40 (i.e., A≤0.3h1); and a wound electrode assembly 40 in which, with respect to the area of the flat section 40*f* of the wound electrode assembly 40, the area of the separator 30 that projects beyond the negative electrode trailing end 20*e* is not more than 0.009 m$^2$.

The present invention has been described in detail in the preceding, but the preceding description is only an example. Thus, various alterations and modifications of the specific examples provided above are encompassed by the herein disclosed art.

What is claimed is:

1. A secondary battery comprising,
    a wound electrode assembly in which a positive electrode plate and a negative electrode plate are wound with a separator interposed therebetween, and
    a battery case that houses the wound electrode assembly, wherein
    the wound electrode assembly is formed in a flat shape, and comprises a pair of curved sections comprising curved outer surfaces, and a flat section comprising a flat outer surface between the pair of curved sections,
    the positive electrode plate comprises a strip-shaped positive electrode core and a positive electrode active material layer formed on at least one surface of the positive electrode core,
    the negative electrode plate comprises a strip-shaped negative electrode core and a negative electrode active material layer formed on at least one surface of the negative electrode core,
    the separator comprises a strip-shaped base material layer, and a surface layer formed on at least one surface of the base material layer and having a mesh structure formed of polyvinylidene fluoride,
    a negative electrode starting end, which is one end of the negative electrode plate in a longitudinal direction, is positioned on an inside of the wound electrode assembly, and a negative electrode trailing end, which is another end of the negative electrode plate in the longitudinal direction, is positioned on an outside of the wound electrode assembly,
    a positive electrode starting end, which is one end of the positive electrode plate in a longitudinal direction, is positioned on the inside of the wound electrode assembly, and a positive electrode trailing end, which is another end of the positive electrode plate in the longitudinal direction, is positioned on the outside of the wound electrode assembly, a separator starting end, which is one end of the separator in a longitudinal direction, is positioned on the inside of the wound electrode assembly, and a separator trailing end, which is another end of the separator in the longitudinal direction, is positioned on the flat section of the outside of the wound electrode assembly,
    the separator is positioned to an outside of the negative electrode trailing end, and
    a distance between the negative electrode trailing end and the separator trailing end is not more than 30 mm.
2. The secondary battery according to claim 1, wherein
    the wound electrode assembly is formed in a flat shape, and comprises a pair of curved sections comprising curved outer surfaces, and a flat section which comprises a flat outer surface and connects the pair of curved sections; and
    a dimension in a height direction of the wound electrode assembly is at least 80 mm, wherein the height direction is a direction perpendicular to a direction of the winding axis of the wound electrode assembly and perpendicular to a thickness direction of the wound electrode assembly.

3. The secondary battery according to claim 2, wherein a dimension in a width direction of the wound electrode assembly is at least 200 mm, wherein the width direction is a direction parallel to the direction of the winding axis of the wound electrode assembly and perpendicular to the thickness direction of the wound electrode assembly.

4. The secondary battery according to claim 2, satisfying formula below, wherein A is a distance between the negative electrode trailing end and the separator trailing end, and B is a dimension in the height direction of the flat section of the wound electrode assembly:

$$A<0.4B.$$

5. The secondary battery according to claim 2, wherein the negative electrode trailing end is located in the curved section.

6. The secondary battery according to claim 1, comprising a winding stop tape, which attaches the separator trailing end to an outermost surface of the wound electrode assembly, and satisfies formulas below, wherein A (mm) is a distance between the negative electrode trailing end and the separator trailing end and C (mm) is a length of the winding stop tape:

$$20 \leq C \leq 40, A \geq 1/2C.$$

7. The secondary battery according to claim 1, comprising a winding stop tape, which attaches the separator trailing end to an outermost perimeter of the wound electrode assembly, wherein
the separator trailing end is positioned in a center region of a longitudinal direction of the winding stop tape, and
the winding stop tape does not overlap with the negative electrode trailing end.

8. The secondary battery according to claim 1, comprising a winding stop tape, which attaches the separator trailing end to an outermost perimeter of the wound electrode assembly, wherein
the winding stop tape is located on the flat section.

9. The secondary battery according to claim 1, wherein in the wound electrode assembly, a portion of the negative electrode plate is disposed outside the positive electrode trailing end.

* * * * *